United States Patent
Fattal et al.

(10) Patent No.: US 11,378,729 B2
(45) Date of Patent: Jul. 5, 2022

(54) BACKLIGHT, MULTIVIEW DISPLAY AND METHOD HAVING A GRATING SPREADER

(71) Applicant: LEIA INC., Menlo Park, CA (US)

(72) Inventors: David A. Fattal, Menlo Park, CA (US); Joseph D. Lowney, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/225,963

(22) Filed: Apr. 8, 2021

(65) Prior Publication Data

US 2021/0223454 A1    Jul. 22, 2021

Related U.S. Application Data

(63) Continuation of application No. PCT/US2019/029733, filed on Apr. 29, 2019.

(60) Provisional application No. 62/745,965, filed on Oct. 15, 2018.

(51) Int. Cl.
*F21V 8/00* (2006.01)

(52) U.S. Cl.
CPC ......... *G02B 6/0016* (2013.01); *G02B 6/0038* (2013.01); *G02B 6/0055* (2013.01); *G02B 6/0068* (2013.01)

(58) Field of Classification Search
CPC ................ G02B 5/0252; G02B 6/0038; G02F 1/133615
See application file for complete search history.

(56) References Cited

U.S. PATENT DOCUMENTS

| | | | |
|---|---|---|---|
| 5,359,691 A | 10/1994 | Tai et al. | |
| 5,462,700 A | 10/1995 | Beeson | |
| 6,327,091 B1 | 12/2001 | Agano | |
| 6,421,103 B2 | 7/2002 | Yamaguchi | |
| 7,223,010 B2 | 5/2007 | Min et al. | |
| 7,540,646 B2 | 6/2009 | Naoi | |

(Continued)

FOREIGN PATENT DOCUMENTS

| | | |
|---|---|---|
| CN | 103885170 A | 6/2014 |
| CN | 207882620 U | 9/2018 |

(Continued)

OTHER PUBLICATIONS

International Search Report and Written Opinion (ISRWO) by International Searching Authority (ISA) Korean Intellectual Property Office (KIPO), dated Aug. 16, 2019 (11 pages) for counterpart parent PCT Application No. PCT/US2019/029733.

(Continued)

*Primary Examiner* — Keith G. Delahoussaye
(74) *Attorney, Agent, or Firm* — J. Michael Johnson

(57) ABSTRACT

A backlight and a multiview display employ a light guide having angle-preserving scattering feature and a grating spreader. The angle-preserving scattering feature is configured to scatter a portion of guided light out of the light guide as emitted light. The grating spreader includes a diffraction grating and is configured to convert light provided by a light source into spatio-angularly homogenous light to be guided as the guided light. The multiview display includes an array of light valves as well as the angle-preserving scattering feature that includes a multibeam element having a size that is comparable to a size of a light valve of the light valve array.

19 Claims, 10 Drawing Sheets

(56) References Cited

U.S. PATENT DOCUMENTS

| | | | |
|---|---|---|---|
| 8,582,056 | B2 | 11/2013 | Shiraishi et al. |
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,835,786 | B2 | 12/2017 | Qi et al. |
| 10,345,505 | B2 | 7/2019 | Fattal |
| 10,459,147 | B2 | 10/2019 | Ma et al. |
| 10,649,128 | B2 | 5/2020 | Fattal et al. |
| 10,678,094 | B2 | 6/2020 | Fattal et al. |
| 10,705,281 | B2 | 7/2020 | Fattal et al. |
| 10,725,226 | B2 | 7/2020 | Fattal et al. |
| 10,798,371 | B2 | 10/2020 | Fattal |
| 10,838,134 | B2 | 11/2020 | Fattal et al. |
| 10,928,677 | B2 | 2/2021 | Aieta et al. |
| 10,942,307 | B2 | 3/2021 | Li et al. |
| 2003/0086030 | A1 | 5/2003 | Taniguchi et al. |
| 2004/0170011 | A1 | 9/2004 | Kim et al. |
| 2007/0081360 | A1 | 4/2007 | Bailey et al. |
| 2010/0309688 | A1 | 12/2010 | Montgomery et al. |
| 2014/0233260 | A1 | 8/2014 | Ahlgren et al. |
| 2015/0036068 | A1* | 2/2015 | Fattal ............... G02F 1/133615 349/15 |
| 2015/0109816 | A1* | 4/2015 | Yagi ............... G02B 6/0031 362/606 |
| 2015/0301261 | A1 | 10/2015 | Nevitt et al. |
| 2016/0018582 | A1 | 1/2016 | Fiorentino et al. |
| 2016/0209574 | A1 | 7/2016 | Powell et al. |
| 2017/0010400 | A1 | 1/2017 | Bang et al. |
| 2017/0299793 | A1* | 10/2017 | Fattal ............... G02F 1/292 |
| 2017/0299794 | A1 | 10/2017 | Fattal |
| 2019/0101681 | A1* | 4/2019 | Meng ............... G02B 6/0023 |
| 2019/0227335 | A1 | 7/2019 | Fattal |
| 2020/0005718 | A1 | 1/2020 | Fattal |
| 2020/0012034 | A1 | 1/2020 | Fattal et al. |
| 2020/0033526 | A1 | 1/2020 | Fattal et al. |
| 2020/0103582 | A1 | 4/2020 | Fattal et al. |
| 2020/0218011 | A1 | 7/2020 | Li et al. |
| 2020/0386937 | A1 | 12/2020 | Li et al. |

FOREIGN PATENT DOCUMENTS

| | | |
|---|---|---|
| JP | 2005108512 A | 4/2005 |
| WO | 20080659906 A1 | 6/2008 |
| WO | 2018186955 A1 | 10/2018 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Lee, Chi-Hung, Angularly positioned LED-based spatial-temporal color separation system, Optics Express, Aug. 2012, pp. 19109-19118, vol. 20, No. 17.

\* cited by examiner

US 11,378,729 B2

BACKLIGHT, MULTIVIEW DISPLAY AND METHOD HAVING A GRATING SPREADER

CROSS-REFERENCE TO RELATED APPLICATIONS

This application is a continuation application of and claims benefit of priority to International Patent Application No. PCT/US2019/029733, filed Apr. 29, 2019, which claims priority to U.S. Provisional Patent Application Ser. No. 62/745,965, filed Oct. 15, 2018, the entirety of both of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting having angle preserving scattering and employing a grating spreader with application to electronic displays and, in particular, multiview displays. In various embodiments consistent with the principles described herein, a backlight including an angle-preserving scattering feature is provided. The angle-preserving scattering feature is configured to provide emitted light that may have light beams with a plurality of different principal angular directions, in some embodiments. The different principal angular directions of the light beams of the emitted light may correspond to directions of various different views of a multiview display, for example. Further, according to various embodiments, the backlight includes a grating spreader configured to spread out light from a light source to provide spatio-angularly homogenous light or light having a substantially spatio-angularly homogenous distribution within the backlight. According to various embodiments, the spatio-angular homogenous light provided by the grating spreader may facilitate or provide substantially uniform illumination across the backlight, avoiding striping, for example.

Figure 1A:
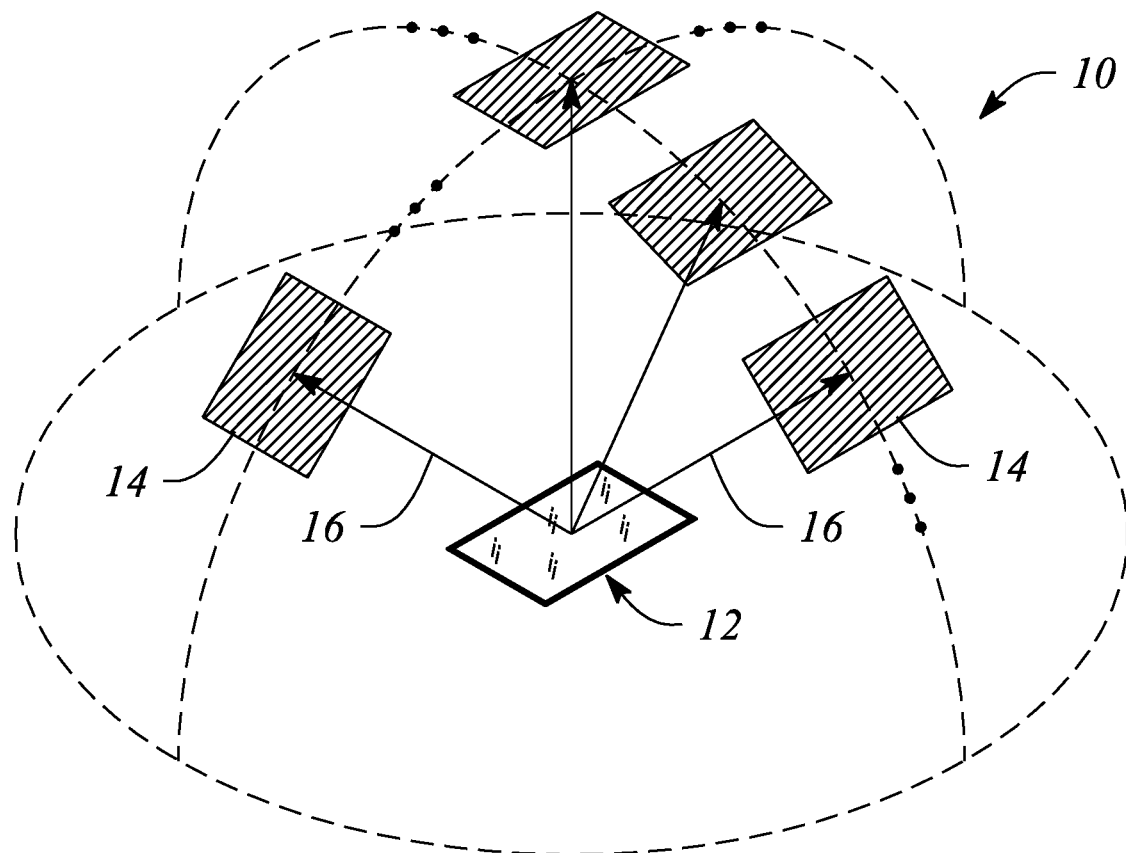
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
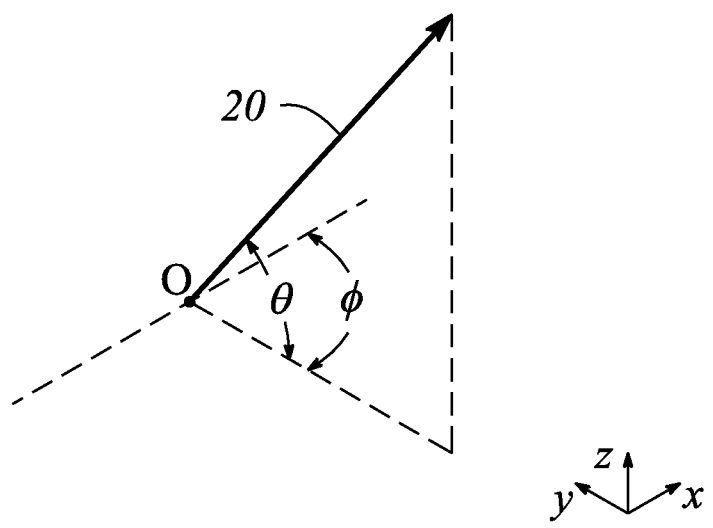
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of view pixels representing 'view' pixels in each of a similar plurality of different views of a multiview display. In particular, a multiview pixel may have an individual view pixel corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels represented by the view pixels of a multiview pixel may have equivalent or at least substantially similar locations or coordinates in each of the different views. For example, a first multiview pixel may have individual view pixels corresponding to view pixels located at $\{x_1, y_1\}$ in each of the different views of a multiview image, while a second multiview pixel may have individual view pixels corresponding to view pixels located at $\{x_2, y_2\}$ in each of the different views, and so on.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may scatter or couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively scatter out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \qquad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
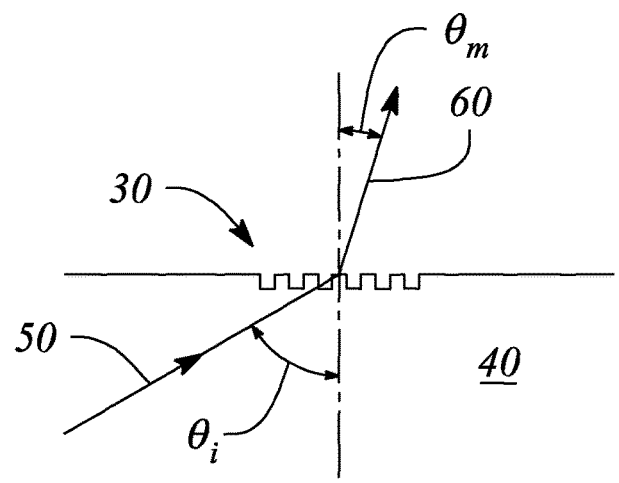
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and scattered-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example.

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling out a portion of light guided in the light guide. In other embodiments, the multibeam element may generate light emitted as the light beams (e.g., may comprise a light source). Further, the light beams of the plurality of light beams produced by a multibeam element have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a light beam produced by the multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor 6 may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, 'spatio-angularly homogenous' light is defined as light that is distributed in a uniform or substantially uniform manner across a spatial and angular region. Further, spatio-angularly homogenous light may also comprise a plurality of light beams having a defined angular spread and a common or substantially common propagation direction within a defined strip or space representing the region, by definition herein. In general, spatio-angularly homogenous light within a light guide may ensure that light is distributed uniformly within the light guide. For example, light from a discrete light source that is provided to a light guide as spatio-angularly homogenous light may substantially fill a region of the light guide defined by a predetermined width, the predetermined width being orthogonal to a propagation direction of guided light within the light guide. When a plurality of discrete light sources are used to illuminate the light guide, the predetermined width may correspond to, and in some embodiments be substantially equal to, a spacing between discrete light sources of the discrete light source plurality, for example. As such, spatio-angularly homogenous light may mitigate or even eliminate striping of light (e.g., bright bands of light with intervening dark regions or bands) within and along the light guide.

Further, as used herein, the article 'a' is intended to have its ordinary meaning in the patent arts, namely 'one or more'. For example, 'an angle-preserving scattering feature' means one or more angle-preserving scattering features and as such, 'the angle-preserving scattering feature' means 'the angle-preserving scattering feature(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
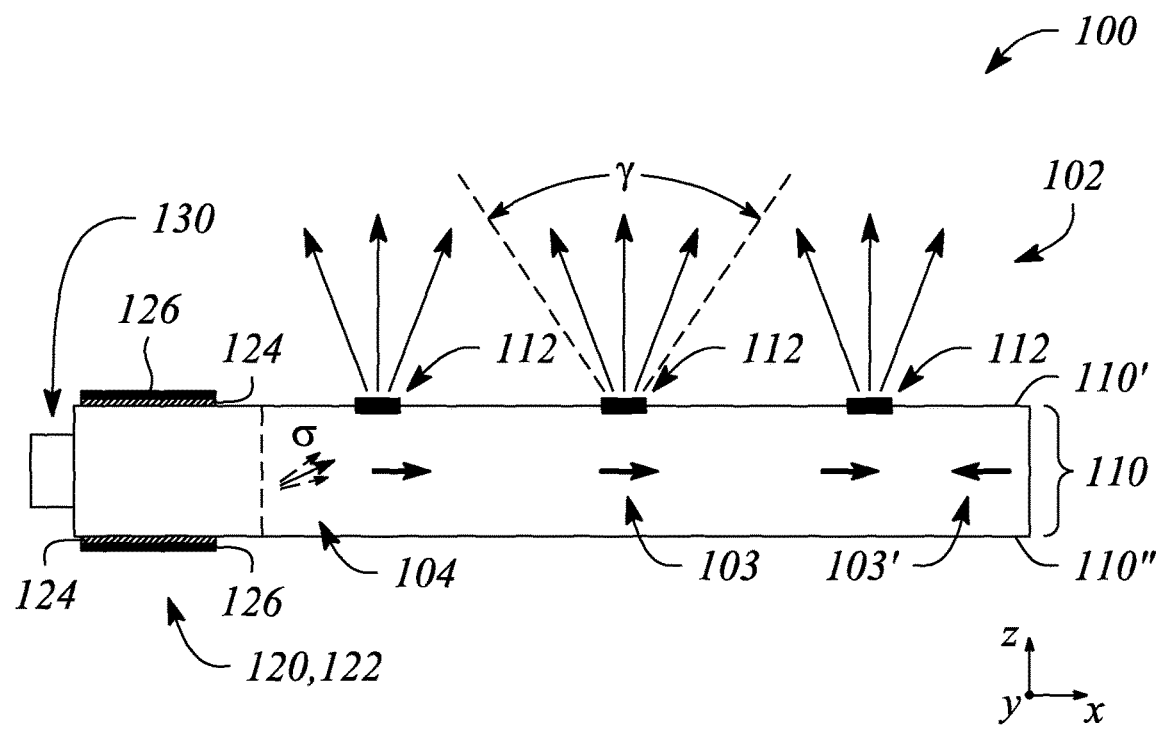
FIG. 3A illustrates a cross sectional view of a backlight in an example, according to an embodiment consistent with the principles described herein.
Figure 3B:
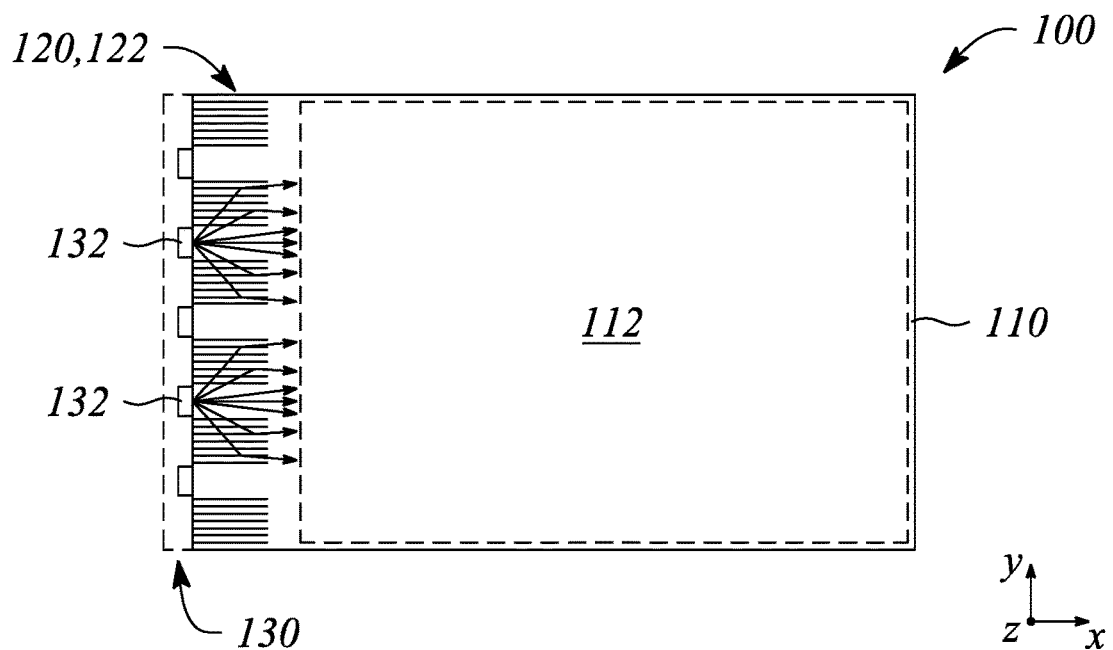
FIG. 3B illustrates a plan view of a backlight in an example, according to an embodiment consistent with the principles described herein.
Figure 3C:
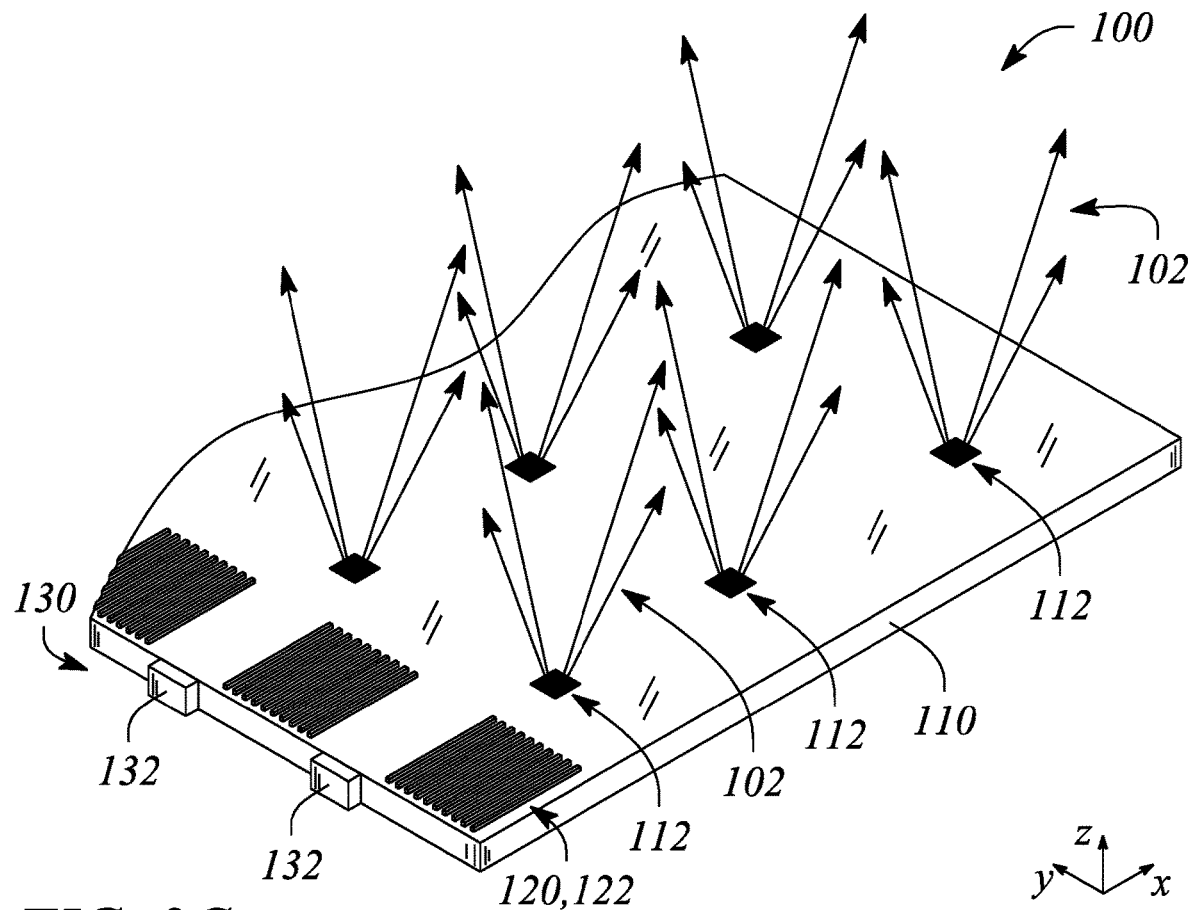
FIG. 3C illustrates a perspective view of a backlight in an example, according to an embodiment consistent with the principles described herein.

According to some embodiments of the principles described herein, a backlight is provided. FIG. 3A illustrates a cross sectional view of a backlight 100 in an example, according to an embodiment consistent with the principles described herein. FIG. 3B illustrates a plan view of a backlight 100 in an example, according to an embodiment consistent with the principles described herein. FIG. 3C illustrates a perspective view of a backlight 100 in an example, according to an embodiment consistent with the principles described herein. The illustrated backlight 100 may be used backlighting in an electronic display including, but not limited to, a multiview display, for example.

The backlight 100 illustrated in FIGS. 3A-3C is configured to provide scattered-out or emitted light 102. The emitted light 102 is directed away from a surface of the backlight 100, as illustrated in FIG. 3A. The emitted light 102 may be employed to illuminate or serve as an illumination source for an electronic display. In particular, the emitted light 102 may be modulated to facilitate the display of information (e.g., images) by the electronic display, for example. In some embodiments, the emitted light 102 may be modulated (e.g., using light valves, as described below) to facilitate the display of information having 3D content or being represented as a multiview image.

In some embodiments (e.g., as described below with respect to a multiview backlight), the emitted light 102 may comprises a plurality of directional light beams in which different ones of the directional light beams have different principal angular directions from one another. For example, the plurality of light beams may represent a light field. Further, the directional light beams have a predetermined angular spread. That is, the principal angular directions of the light beams of the emitted light 102 may be constrained to be substantially within a predetermined subtended angle $\gamma$. For example, the predetermined subtended angle $\alpha$ (or equivalently the angular spread $\gamma$) may be defined the with respect to a central light beam of the directional light beam plurality. Further, according to some embodiments, the provided plurality of directional light beams of the emitted light 102 may be directed away from the backlight 100 in different principal angular directions corresponding to respective view directions of a multiview display, e.g., a multiview display that may be used to display a 3D or multiview image. As such, the backlight 100 may be a multiview backlight, as described further below.

As illustrated in FIG. 3A-3C, the backlight 100 comprises a light guide 110. The light guide 110 may be a plate light guide, according to some embodiments. The light guide 110 is configured to guide light along a length of the light guide 110 as guided light 104. For example, the light guide 110 may include a dielectric material configured as an optical waveguide. The dielectric material of the optical waveguide may have a first refractive index that is greater than a second refractive index of a medium surrounding the dielectric optical waveguide. The difference in refractive indices is configured to facilitate total internal reflection of the guided light 104 according to one or more guided modes of the light guide 110. In FIG. 3A, a propagation direction 103 of the guided light 104 is indicated by bold arrows.

In some embodiments, the dielectric optical waveguide of the light guide 110 may be a slab or plate optical waveguide comprising an extended, substantially planar sheet of optically transparent, dielectric material. According to various examples, the optically transparent, dielectric material of the light guide 110 may include or be made up of any of a variety of dielectric materials including, but not limited to, one or more of various types of glass (e.g., silica glass, alkali-aluminosilicate glass, borosilicate glass, etc.), one or more substantially optically transparent plastics or polymers (e.g., poly(methyl methacrylate) or 'acrylic glass', polycarbonate, etc.) or a combination thereof. In some embodiments, the light guide 110 may further include a cladding layer (not illustrated) on at least a portion of a surface (e.g., one or both of a top surface and a bottom surface) of the light guide 110. The cladding layer may be used to further facilitate total internal reflection, according to some examples.

According to some embodiments, the light guide 110 is configured to guide the guided light 104 according to total internal reflection at a non-zero propagation angle between a first surface 110' (e.g., 'front' surface or side) and a second surface 110" (e.g., 'back' surface or side) of the light guide 110. In particular, the guided light 104 may propagate by reflecting or 'bouncing' between the first surface 110' and the second surface 110" of the light guide 110 at the non-zero propagation angle (albeit in the propagation direction 103 indicated by the bold arrows). In some embodiments, a plurality of guided light beams comprising different colors of light may be guided by the light guide 110 at respective ones of different color-specific, non-zero propagation angles. The non-zero propagation angle is not illustrated in FIGS. 3A-3C for simplicity of illustration.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110. Further, the guided light 104 or equivalently the guided light 'beam' 104 may be a collimated light beam (e.g., provide by a grating spreader, described below), according to various embodiments. Herein, a 'collimated light' or 'collimated light beam' is generally defined as a beam of light in which rays of the light beam are substantially confined to a predetermined or defined angular spread within the light beam (e.g., the guided light 104). Further, rays of light that diverge or are scattered from the collimated light beam are not considered to be part of the collimated light beam, by definition herein. Moreover, the guided light 104 may be collimated according to or having a collimation factor, in various embodiments.

In some embodiments, the light guide 110 may be configured to 'recycle' the guided light 104. In particular, the guided light 104 that has been guided along the light guide length may be redirected back along that length in another propagation direction 103' that differs from (e.g., is opposite to) the propagation direction 103. For example, the light guide 110 may include a reflector (not illustrated) at an end of the light guide 110 opposite to an input end or entrance edge adjacent to the light source. The reflector may be configured to reflect the guided light 104 back toward the entrance edge as recycled guided light. In FIG. 3A, a bold arrow indicating a propagation direction 103' of recycled guided light (e.g., directed in a negative x-direction) illustrates a general propagation direction of the recycled guided light within the light guide 110. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103). Recycling guided light 104 or alternatively providing guided light 104 in the other propagation direction 103' may increase a brightness of the backlight 100 (e.g., an intensity of the directional light beams of the emitted light 102) by making guided light available to be scattered out of the backlight 100 more than once, for example, e.g., by angle-preserving scatterers described below.

According to various embodiments, the light guide 110 has an angle-preserving scattering feature 112. The angle-preserving scattering feature 112 is configured to scatter a portion of the guided light 104 out of the light guide 110 as the emitted light 102. In some embodiments (e.g., as illustrated), the angle-preserving scattering feature 112 comprises a plurality of angle-preserving scatterers. In particular, individual angle-preserving scatterers of the angle-preserving scattering feature 112 may be discrete structures or features that are spaced apart from one another, each discrete structure being configured to scatter or couple out a different portion of the guided light 104 in an angle-preserving manner. In various embodiments, the angle-preserving scattering feature 112 may comprise any of variety of different structures or features that provide or are configured to produce angle-preserving scattering including, but not limited to, a diffraction grating, a reflective structure and a refractive structure as well as various combinations thereof.

Further, according to various embodiments, an angular spread of the emitted light 102 or equivalently of the directional light beams of the emitted light 102 is determined by a characteristic of the angle-preserving scattering feature 112. In particular, the angle-preserving scattering feature 112 is configured to scatter a portion of the guided light 104 out of the light guide 110 as the emitted light 102 having the angular spread characterized by a predetermined subtended angle γ. As a result, the emitted light 102 may be substantially confined within the predetermined subtended angle γ (or equivalently within the angular spread) as a result of the scattering by the angle-preserving scattering feature 112. Moreover, the angular spread of the emitted light 102 is a function of, and in some embodiments is proportional to, the collimation factor of the guided light 104. For example, the predetermined subtended angle γ of the angular spread (or equivalently the 'angular spread') may be given by equation (2) as $$\gamma = f(\sigma) \qquad (2)$$

where σ is the collimation factor of the guided light 104 and $f(\cdot)$ represents a function such as, but not limited to, a linear function of the collimation factor σ. For example, the function $f(\cdot)$ may be given as $\gamma = a \cdot \sigma$, where a is an integer.

As illustrated in FIGS. 3A-3C, the backlight 100 further comprises a grating spreader 120. According to various embodiments (e.g., as illustrated), the grating spreader 120 may be located between a source of light (e.g., a light source 130, described below) used to provide light to be guided as the guided light 104 in the light guide 110 and the angle-preserving scattering feature 112 of the light guide 110. The grating spreader 120 is configured to convert the light provided to the light guide 110 by the source of light into spatio-angularly homogenous light within the light guide. That is, the grating spreader 120 is configured to receive the provided light from the source of light and then to spread the provided light across a width of the light guide in a spatio-angularly homogenous manner as the spatio-angularly homogenous light. The spatio-angularly homogenous light then becomes light to be guided within the light guide 110 as the guided light 104.

FIG. 3B illustrates light from the source of light within the light guide 110 as arrows extending in various radial directions to depict the light provided to the light guide 110. As illustrated by the arrows, a portion of the light may simply pass through the grating spreader 120, while another portion may be redirected (e.g., diffractively redirected) by the grating spreader 120. Together the light that simply passes through and the portion that is redirected by the grating spreader 120 combine to provide the spatio-angularly homogenous light that is to be guided as the guided light 104. The spatio-angularly homogenous light within the light guide 110 may facilitate uniform illumination of the backlight 100, according to various embodiments.

In some embodiments, the grating spreader 120 is further configured to reduce an angular spread of the spatio-angularly homogenous light that is guided within the light guide 110. In particular, the angular spread of the spatio-angularly homogenous light may be reduced by the grating spreader 120 to substantially collimate the light according to a collimation factor σ. According to various embodiments, the collimation factor σ may be configured to provide a predetermined angular spread of the guided light 104. In some embodiments, the spatio-angularly homogenous light having the reduced angular spread at an output of the grating spreader 120 may further facilitate or provide substantially uniform illumination of the light guide 110.

According to various embodiments, the grating spreader 120 illustrated in FIGS. 3A-3C comprises a diffraction grating 122 having diffractive features that extend parallel to or substantially parallel to a propagation direction (e.g., propagation direction 103) of the guided light 104 within the light guide 110. For example, the diffractive features of the diffraction grating 122 may comprise one or both of ridges and grooves at a surface of the light guide 110, the ridges and grooves extending in a direction away from an input edge of the light guide 110 (e.g., adjacent to the light source 130 in FIGS. 3A-3C) and toward the angle-preserving scattering feature 112 of the light guide 110. As illustrated in FIG. 3B, the light provided by the source of light may interact with and be diffracted (i.e., diffractively redirected) by the diffraction grating 122 to convert the provided light into spatio-homogenous light, e.g., as illustrated by arrows in FIG. 3B.

In some embodiments, the diffraction grating 122 may comprise a material of the light guide 110, e.g., the diffractive features may be formed in the light guide surface. In other embodiments, the diffraction grating 122 may comprise a layer of material on the light guide surface and the diffractive features may be formed in the material layer. In some embodiments, the diffraction grating 122 of the grating spreader 120 may comprise diffractive features located on, in or adjacent to opposing surfaces of the light guide 110. For example, the diffractive features of the diffraction grating 122 may be located on one or both of the first surface 110' and the second surface 110" of the light guide 110.

In some embodiments, the diffraction grating 122 of the grating spreader 120 may comprise a reflection mode diffraction grating. As a reflection mode diffraction grating, the diffraction grating 122 is configured to both diffract light and reflect light back into the light guide 110, by definition herein. In some embodiments, the diffraction grating 122 as a reflection mode diffraction grating comprises a grating layer 124 having the diffractive features and a reflective layer 126, the grating layer 124 being between the light guide 110 and the reflective layer 126. For example, the grating layer 124 may comprise a dielectric material such as, but not limited to, various plastics or polymers (e.g., poly (methyl methacrylate) or 'acrylic glass', polycarbonate, etc.), while the reflective layer 126 may comprise any of a variety of reflective material including, but not limited to, a reflective metal or an enhanced specular reflector (ESR) film, for example. In other non-limiting embodiments, the diffraction grating 122 as a reflection mode diffraction grating may be a metal diffraction grating 122.

As illustrated in FIGS. 3A-3C, the backlight 100 may further comprise a light source 130. According to various embodiments, the light source 130 is configured to provide the light to light guide 110 to be guided as the guided light 104, the provided light first passing through the grating spreader 120 to convert the provided light into the spatio-angularly homogenous light and then continuing on as the guided light 104. In particular, the light source 130 may be located adjacent to the input edge of the light guide 110 and the grating spreader 120 may be located between the light source 130 and the angle-preserving scatter feature 112 of the light guide 110. In some embodiments (e.g., as illustrated), the light source 130 may comprise a plurality of optical emitters 132 spaced apart from one another along the input edge of the light guide 110.

In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 130 may be a substantially broadband light source configured to provide substantially broadband or polychromatic light. For example, the light source 130 may provide white light. In some embodiments, the light source 130 may comprise a plurality of different optical emitters configured to provide different colors of light. The different optical emitters may be configured to provide light having different, color-specific, non-zero propagation angles of the guided light corresponding to each of the different colors of light.

In some embodiments (e.g., as illustrated in FIGS. 3A-3C), the diffraction grating 122 of the grating spreader 120 may comprise a plurality of separate or individual diffraction gratings located between optical emitters of the optical emitter plurality of the light source 130. In other embodiments, the diffraction grating 122 of the grating spreader 120 may be distributed across a width of the light guide 110 between the light source 130 and the angle-preserving scattering feature 112. For example, the diffraction grating may be distributed across the width of the light guide 110 in a substantially uniform manner. Here, the 'width dimension' or simply 'width' is defined as a dimension in a direction corresponding to a width of the light guide 110. The light guide 'width', in turn, is defined as a dimension along or corresponding to ay-axis, as illustrated in FIGS. 3A-3C, which is in a plane that is substantially orthogonal to the general propagation direction the guided light 104. The width of the light guide 110 is also substantially perpendicular to a height or thickness of the light guide 110, e.g., a dimension along or corresponding to a z-axis illustrated in FIGS. 3A-3C. In some embodiments, a length or a length profile of the diffractive features of the diffraction grating(s) 122 may vary in the propagation direction 103 of the guided light 104. In particular, the length profile may vary as a function of distance along the input edge of the light guide 110. In some embodiments, a pitch or spacing between diffractive features of the diffraction grating(s) 122 may vary as a function of distance along the width dimension (e.g., the diffraction grating 122 may be chirped). In some embodiments, another characteristic of the diffraction grating(s) 122 may vary including, but not limited to, a duty cycle of the diffraction grating(s) 122 and a cross sectional profile of the diffractive features. Varying characteristics of the diffraction grating 122 may be configured to tailor an intensity distribution or a spread angle of the guided light 104 within the light guide 110, according to some embodiments.

Figure 4:
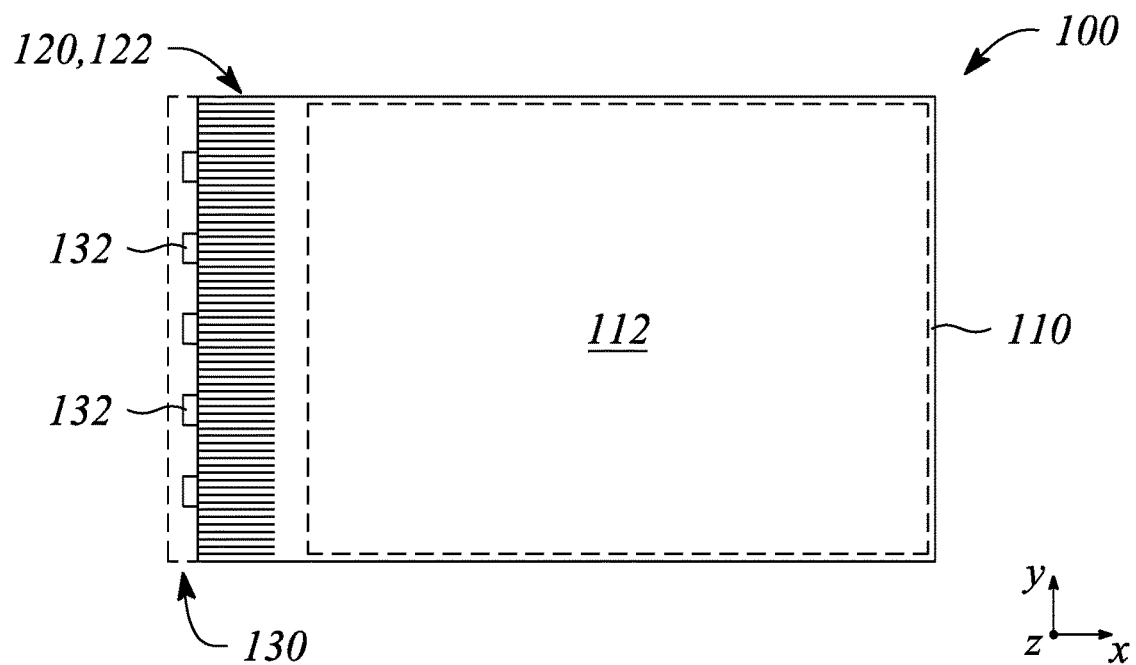
FIG. 4 illustrates a plan view of a backlight in an example, according to an embodiment consistent with the principle described herein.
Figure 5:
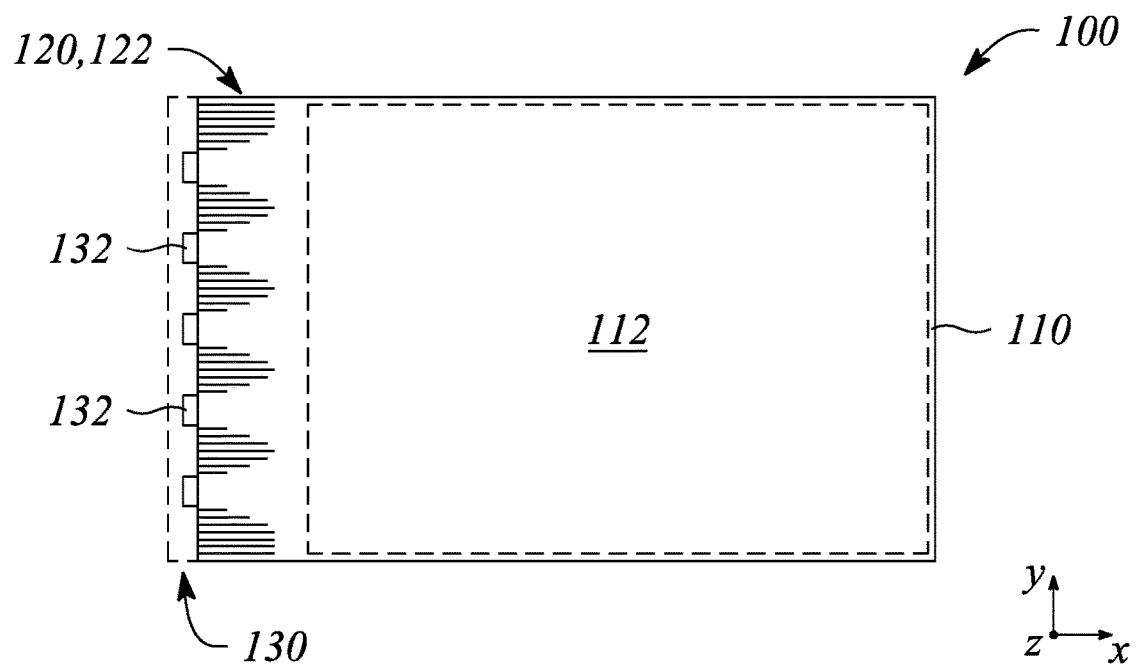
FIG. 5 illustrates a plan view of a backlight in an example, according to another embodiment consistent with the principles described herein.

FIG. 4 illustrates a plan view of a backlight 100 in an example, according to an embodiment consistent with the principle described herein. FIG. 5 illustrates a plan view of a backlight 100 in an example, according to another embodiment consistent with the principles described herein. In particular, both FIG. 4 and FIG. 5 illustrate the backlight 100 including the light guide 110 having the angle-preserving scattering feature 112, the light source 130 at an input edge of the light guide 110, the grating spreader 120 between the light source 130 and the angle-preserving scattering feature 112. Further, FIG. 4 illustrates the diffraction grating 122 of the grating spreader 120 as distributed across the width of the light guide 110 as a continuous diffraction grating. The diffraction grating 122 includes diffractive features having substantially equal lengths, by way of example and not limitation. Arrows in FIG. 4 illustrate the light provided by the light source 130 as well as diffractive redirection of the provided light that results in conversion of the provided light by the grating spreader 120 into the spatio-angularly homogenous light.

FIG. 5 illustrates the diffraction grating 122 comprising the plurality of individual diffraction gratings 122 spaced apart from one another and being located between optical emitters 132 of the light source 130, e.g., similar to FIG. 3B. Further, FIG. 5 illustrates the diffraction grating 122 having a length profile that varies as a function of distance along the width of the light guide 110. In particular, individual diffraction gratings 122 of the plurality of individual diffraction gratings 122 have diffractive features that are longer in a middle of the individual diffraction gratings 122 than at an edge thereof. The varying length profile of the diffraction grating(s) 122 may be used to control an amount of conversion of the provided light by the grating spreader 120 or equivalently to control a degree of illumination uniformity provide by the spatio-angularly homogenous light, for example. While not illustrated, characteristics such as length profile, pitch, duty cycle, etc., of the continuous diffraction grating illustrated in FIG. 4 may also vary across the width dimension, in some embodiments.

Referring again to FIG. 3A-3C, in some embodiments the angle-preserving scattering feature 112 of the light guide 110 in the backlight 100 may comprise a multibeam element. In particular, the angle-preserving scattering feature 112 illustrated in FIGS. 3A-3C may comprise a plurality of multibeam elements. The backlight 100 with a light guide 110 having an angle-preserving scattering feature 112 comprising a multibeam element may be referred to as a 'multibeam' backlight, as is further described in more detail below.

Figure 6A:
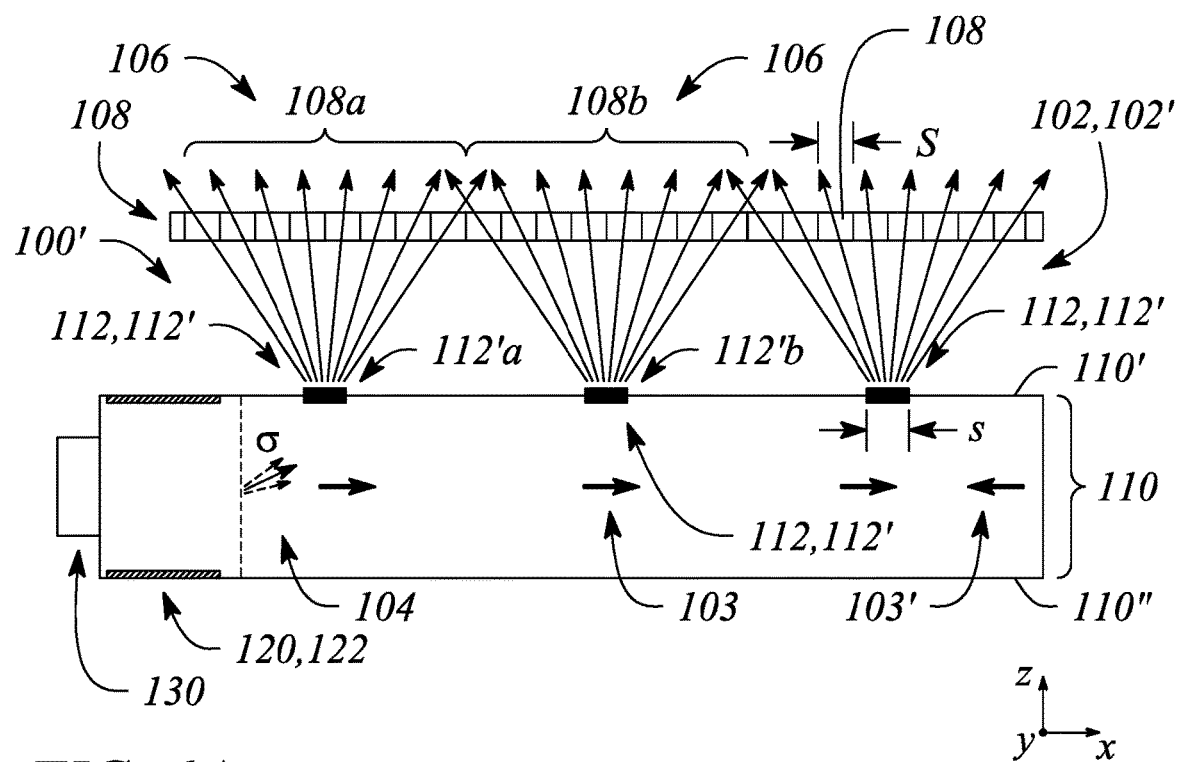
FIG. 6A illustrates a cross sectional view of a multiview backlight in an example, according to an embodiment consistent with the principles described herein.
Figure 6B:
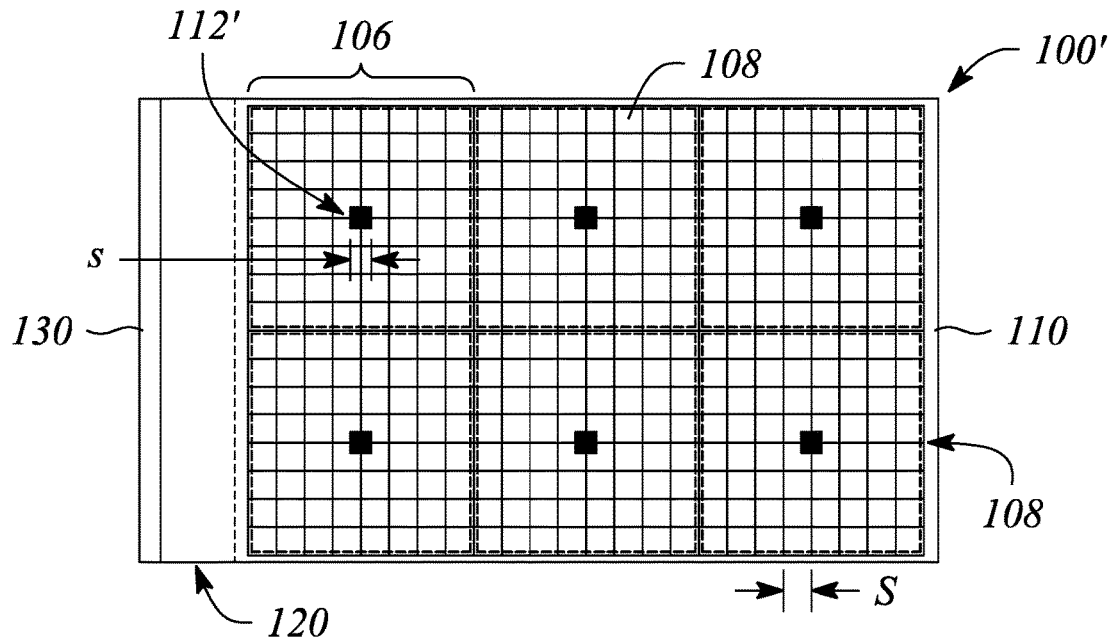
FIG. 6B illustrates a plan view of a multiview backlight in an example, according to an embodiment consistent with the principles described herein.
Figure 6C:
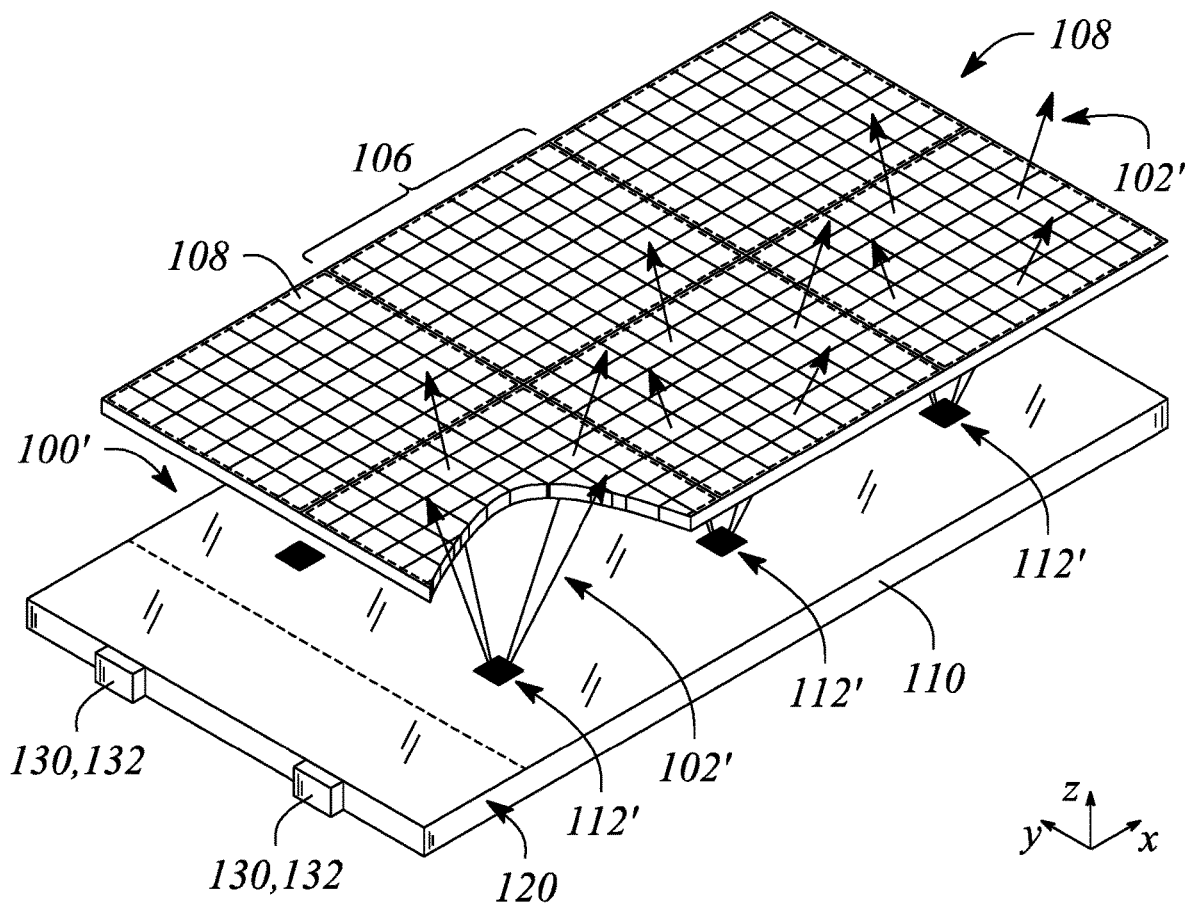
FIG. 6C illustrates a perspective view of a multiview backlight of in an example, according to an embodiment consistent with the principles described herein.

FIG. 6A illustrates a cross sectional view of a multiview backlight 100' in an example, according to an embodiment consistent with the principles described herein. FIG. 6B illustrates a plan view of a multiview backlight 100' in an example, according to an embodiment consistent with the principles described herein. FIG. 6C illustrates a perspective view of a multiview backlight 100' in an example, according to an embodiment consistent with the principles described herein. As illustrated, the multiview backlight 100' comprises the light guide 110 having the angle-preserving scattering feature 112 and the grating spreader 120 (not illustrated in FIG. 6B). Further, the angle-preserving scattering feature 112 illustrated in FIGS. 6A-6C comprises a plurality of multibeam elements 112'.

According to various embodiments, multibeam elements 112' of the multibeam element plurality may be spaced apart from one another along a length of the light guide 110. In particular, the multibeam elements 112' may be separated from one another by a finite space and represent individual, distinct elements along the light guide length. Further the multibeam elements 112' generally do not intersect, overlap or otherwise touch one another, according to some embodiments. That is, each multibeam element 112' of the multibeam element plurality is generally distinct and separated from other ones of the multibeam elements 112'.

According to some embodiments, the plurality of multibeam elements 112' of the angle-preserving scattering feature 112 may be arranged in either a one-dimensional (1D) array or two-dimensional (2D) array. For example, the plurality of multibeam elements 112' may be arranged as a linear 1D array. In another example, the plurality of multibeam elements 112' may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 112' may be substantially uniform or constant across the array. In other examples, the inter-element distance between the multibeam elements 112' may be varied one or both of across the array and along the length of the light guide 110.

According to various embodiments, a multibeam element 112' of the plurality is configured to scatter out a portion of the guided light 104 as the emitted light 102. Further, the emitted light 102 comprises a plurality of directional light beams 102'. In FIGS. 6A and 6C, the directional light beams 102' are illustrated as a plurality of diverging arrows depicted as being directed way from the first (or front) surface 110' of the light guide 110. According to various embodiments, the directional light beams 102' have different principal angular directions from one another. Further, the different principal angular directions of the directional light beams 102' correspond to respective different view directions of a multiview display comprising multiview pixels, according to various embodiments.

In addition, a size of the multibeam element 112' may be comparable to a size of a view pixel in a multiview pixel 106 or equivalently a size of a light valve (e.g., light valve 108, described below) of the multiview display, according to some embodiments. Herein, the 'size' may be defined in any of a variety of manners to include, but not be limited to, a length, a width or an area. For example, the size of the light valve may be a length thereof and the comparable size of the multibeam element 112' may also be a length of the multibeam element 112'. In another example, size may refer to an area such that an area of the multibeam element 112' may be comparable to an area of the light valve.

In some embodiments, the size of the multibeam element 112' is comparable to the light valve size such that the multibeam element size is between about fifty percent (50%) and about two hundred percent (200%) of the light valve size. In other examples, the multibeam element size is greater than about sixty percent (60%) of the light valve size, or about seventy percent (70%) of the light valve size, or greater than about eighty percent (80%) of the light valve size, or greater than about ninety percent (90%) of the light valve size, and the multibeam element 112' is less than about one hundred eighty percent (180%) of the light valve size, or less than about one hundred sixty percent (160%) of the light valve size, or less than about one hundred forty percent (140%) of the light valve size, or less than about one hundred twenty percent (120%) of the light valve size. For example, by 'comparable size', the multibeam element size may be between about seventy-five percent (75%) and about one hundred fifty (150%) of the light valve size. In another example, the multibeam element 112' may be comparable in light valve size where the multibeam element size is between about one hundred twenty-five percent (125%) and about eighty-five percent (85%) of the light valve size. According to some embodiments, the comparable sizes of the multibeam element 112' and the light valve may be chosen to reduce, or in some examples to minimize, dark zones between views of the multiview display, while at the same time reducing, or in some examples minimizing, an overlap between views of the multiview display. FIGS. 6A-6C also illustrate multiview pixels 106 along with the multiview backlight 100' for the purpose of facilitating discussion. In FIGS. 6A-6B, the multibeam element size is denoted 's' and the view pixel size or light valve size is denoted 'S'.

FIGS. 6A-6C further illustrate an array of light valves 108 configured to modulate the directional light beams 102' of the directional light beam plurality within the emitted light 102. The light valve array may be part of a multiview display that employs the multiview backlight 100', for example, and is illustrated in FIGS. 6A-6C along with the multiview backlight 100' for the purpose of facilitating discussion herein. In FIG. 6C, the array of light valves 108 is partially cut-away to allow visualization of the light guide 110 and the multibeam element 112' underlying the light valve array. In various embodiments, different types of light valves may be employed as the light valves 108 of the light valve array including, but not limited to, one or more of liquid crystal light valves, electrophoretic light valves, and light valves based on electrowetting.

As illustrated in FIGS. 6A-6C, different ones of the directional light beams 102' pass through and may be modulated by different ones of the light valves 108 in the light valve array. Further, as illustrated, a light valve 108 of the array corresponds to a view pixel, and a set of the light valves 108 corresponds to a multiview pixel 106 of a multiview display. In particular, a different set of light valves 108 of the light valve array is configured to receive and modulate the directional light beams 102' from different ones of the multibeam elements 112', i.e., there is one unique set of light valves 108 for each multibeam element 112', as illustrated.

As illustrated in FIG. 6A, a first light valve set 108a is configured to receive and modulate the directional light beams 102' from a first multibeam element 112'a, while a second light valve set 108b is configured to receive and modulate the directional light beams 102' from a second multibeam element 112'b. Thus, each of the light valve sets (e.g., the first and second light valve sets 108a, 108b) in the light valve array corresponds, respectively, to a different multiview pixel 106, with individual light valves 108 of the light valve sets corresponding to the view pixels of the respective multiview pixels 106, as illustrated in FIG. 6A.

In some embodiments, a shape of the multibeam element 112' is analogous to a shape of the multiview pixel 106 or equivalently, a shape of a set (or 'sub-array') of the light valves 108 corresponding to the multiview pixel 106. For example, the multibeam element 112' may have a square shape and the multiview pixel 106 (or an arrangement of a corresponding set of light valves 108) may be substantially square. In another example, the multibeam element 112' may have a rectangular shape, i.e., may have a length or longitudinal dimension that is greater than a width or transverse dimension. In this example, the multiview pixel 106 (or equivalently the arrangement of the set of light valves 108) corresponding to the multibeam element 112' may have an analogous rectangular shape. FIG. 6B illustrates a top or plan view of square-shaped multibeam elements 112' and corresponding square-shaped multiview pixels 106 comprising square sets of light valves 108. In yet other examples (not illustrated), the multibeam elements 112' and the corresponding multiview pixels 106 have various shapes including or at least approximated by, but not limited to, a triangular shape, a hexagonal shape, and a circular shape.

According to various embodiments, the multibeam elements 112' may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element 112' comprising a diffraction grating is configured to diffractively scatter out the guided light portion as the plurality of directional light beams 102' having the different principal angular directions. In other embodiments, the multibeam element 112' comprising a micro-reflective element is configured to reflectively scatter out the guided light portion as the plurality of directional light beams 102', or the multibeam element 112' comprising a micro-refractive element is configured to scatter out the guided light portion as the plurality of directional light beams 102' by or using refraction (i.e., refractively scatter out the guided light portion).

Figure 7A:
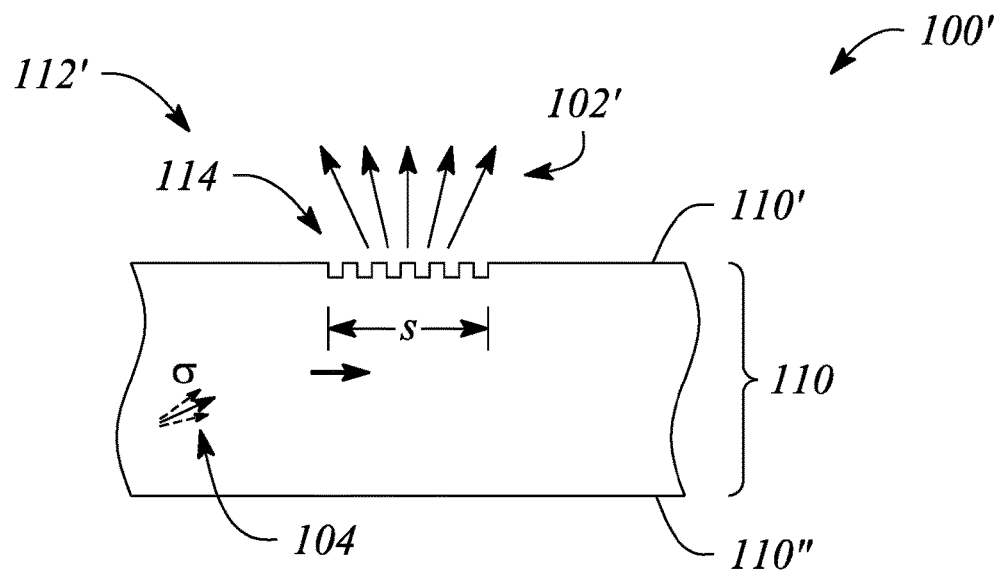
FIG. 7A illustrates a cross sectional view of a portion of a multiview backlight including a multibeam element in an example, according to an embodiment consistent with the principles described herein.
Figure 7B:
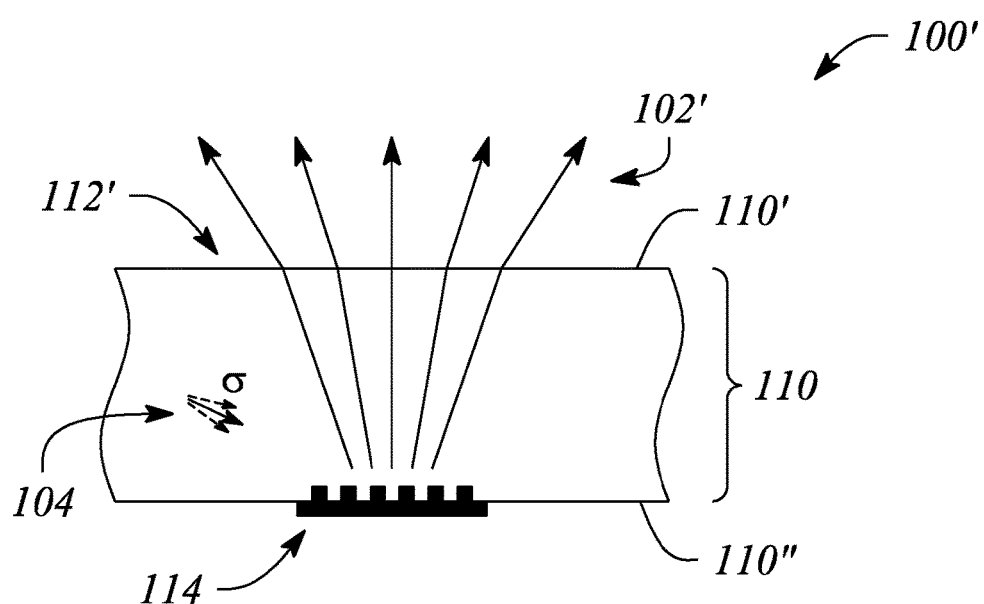
FIG. 7B illustrates a cross sectional view of a portion of a multiview backlight including a multibeam element in an example, according to another embodiment consistent with the principles described herein.

FIG. 7A illustrates a cross sectional view of a portion of a multiview backlight 100' including a multibeam element 112' in an example, according to an embodiment consistent with the principles described herein. FIG. 7B illustrates a cross sectional view of a portion of a multiview backlight 100' including a multibeam element 112' in an example, according to another embodiment consistent with the principles described herein. In particular, FIGS. 7A-7B illustrate the multibeam element 112' of the multiview backlight 100' comprising a diffraction grating 114. The diffraction grating 114 is configured to diffractively scatter out a portion of the guided light 104 as the plurality of directional light beams 102' of the emitted light 102. The diffraction grating 114 comprises a plurality of diffractive features spaced apart from one another by a diffractive feature spacing or a diffractive feature or grating pitch configured to provide diffractive coupling out of the guided light portion. According to various embodiments, the spacing or grating pitch of the diffractive features in the diffraction grating 114 may be sub-wavelength (i.e., less than a wavelength of the guided light).

In some embodiments, the diffraction grating 114 of the multibeam element 112' may be located at or adjacent to a surface of the light guide 110. For example, the diffraction grating 114 may be at or adjacent to the first surface 110' of the light guide 110, as illustrated in FIG. 7A. The diffraction grating 114 at light guide first surface 110' may be a transmission mode diffraction grating configured to diffractively scatter out the guided light portion through the first surface 110' as the directional light beams 102'. In another example, as illustrated in FIG. 7B, the diffraction grating 114 may be located at or adjacent to the second surface 110" of the light guide 110. When located at the second surface 110", the diffraction grating 114 may be a reflection mode diffraction grating. As a reflection mode diffraction grating, the diffraction grating 114 is configured to both diffract the guided light portion and reflect the diffracted guided light portion toward the first surface 110' to exit through the first surface 110' as the diffractively directional light beams 102'. In other embodiments (not illustrated), the diffraction grating may be located between the surfaces of the light guide 110, e.g., as one or both of a transmission mode diffraction grating and a reflection mode diffraction grating. Note that, in some embodiments described herein, the principal angular directions of the directional light beams 102' may include an effect of refraction due to the directional light beams 102' exiting the light guide 110 at a light guide surface. For example, FIG. 7B illustrates refraction (i.e., bending) of the directional light beams 102' due to a change in refractive index as the directional light beams 102' cross the first surface 110', by way of example and not limitation. Also see FIGS. 8A and 8B, described below.

According to some embodiments, the diffractive features of the diffraction grating 114 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110.

In some embodiments, the diffraction grating 114 of the multibeam element 112' is a uniform diffraction grating in which the diffractive feature spacing is substantially constant or unvarying throughout the diffraction grating 114. In other embodiments, the diffraction grating 114 is a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multibeam element 112' may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 8A:
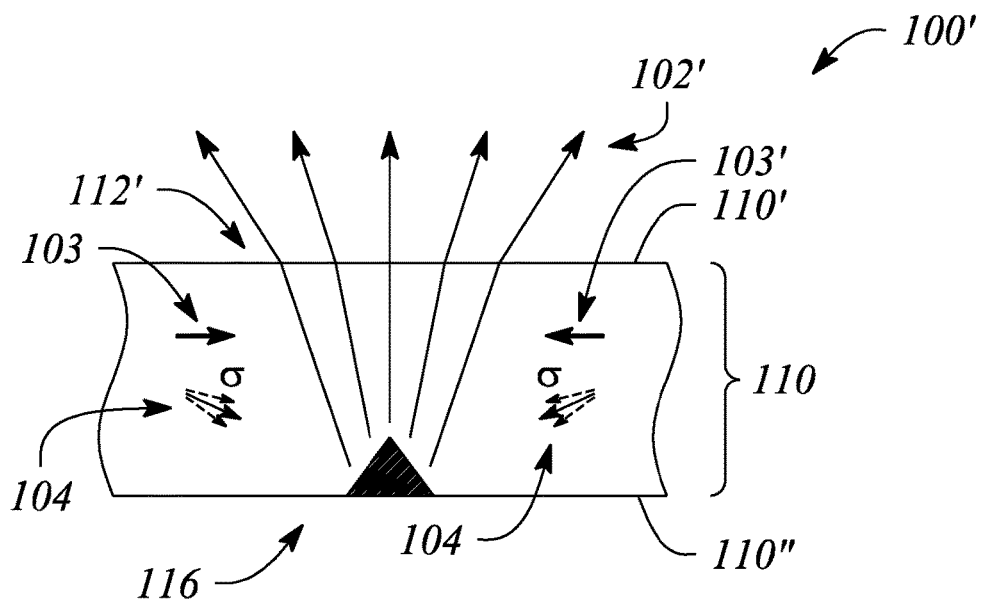
FIG. 8A illustrates a cross sectional view of a portion of a multiview backlight including a multibeam element in an example, according to another embodiment consistent with the principles described herein.
Figure 8B:
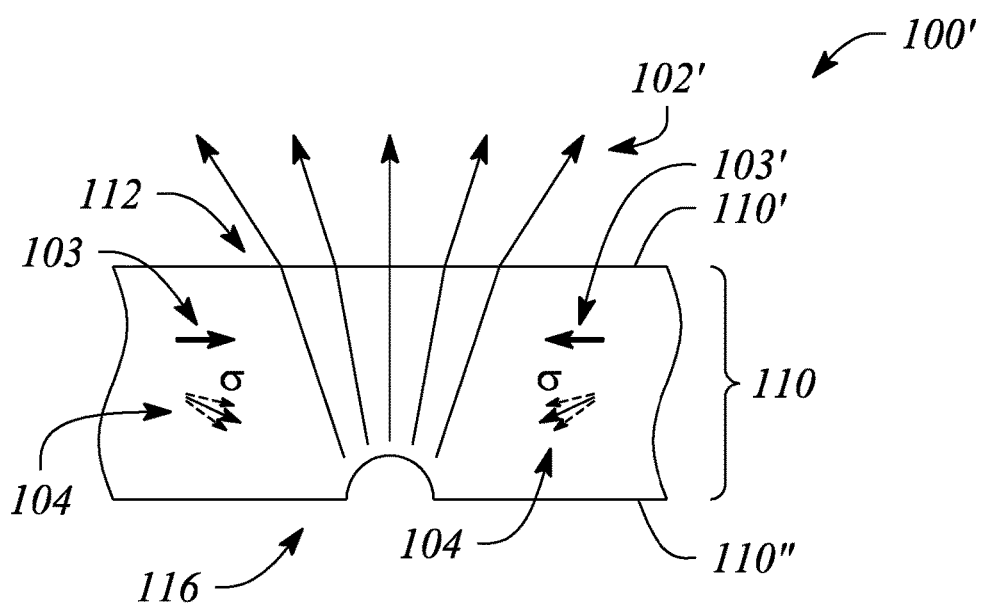
FIG. 8B illustrates a cross sectional view of a portion of a multiview backlight including a multibeam element in an example, according to another embodiment consistent with the principles described herein.

FIG. 8A illustrates a cross sectional view of a portion of a multiview backlight 100' including a multibeam element 112' in an example, according to another embodiment consistent with the principles described herein. FIG. 8B illustrates a cross sectional view of a portion of a multiview backlight 100' including a multibeam element 112' in an example, according to another embodiment consistent with the principles described herein. In particular, FIGS. 8A and 8B illustrate various embodiments of the multibeam element 112' comprising a micro-reflective element. Micro-reflective elements used as or in the multibeam element 112' may include, but are not limited to, a reflector that employs a reflective material or layer thereof (e.g., a reflective metal) or a reflector based on total internal reflection (TIR). According to some embodiments (e.g., as illustrated in FIGS. 8A-8B), the multibeam element 112' comprising the micro-reflective element may be located at or adjacent to a surface (e.g., the second surface 110") of the light guide 110. In other embodiments (not illustrated), the micro-reflective element may be located within the light guide 110 between the first and second surfaces 110', 110".

For example, FIG. 8A illustrates the multibeam element 112' comprising a micro-reflective element 116 having reflective facets (e.g., a 'prismatic' micro-reflective element) located adjacent to the second surface 110" of the light guide 110. The facets of the illustrated prismatic micro-reflective element 116 are configured to reflect (i.e., reflectively scatter) the portion of the guided light 104 out of the light guide 110. The facets may be slanted or tilted (i.e., have a tilt angle) relative to a propagation direction of the guided light 104 to reflect the guided light portion out of light guide 110, for example. The facets may be formed using a reflective material within the light guide 110 (e.g., as illustrated in FIG. 8A) or may be surfaces of a prismatic cavity in the second surface 110", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another example, FIG. 8B illustrates the multibeam element 112' comprising a micro-reflective element 116 having a substantially smooth, curved surface such as, but not limited to, a semi-spherical micro-reflective element 116. A specific surface curve of the micro-reflective element 116 may be configured to reflect the guided light portion in different directions depending on a point of incidence on the curved surface with which the guided light 104 makes contact, for example. As illustrated in FIGS. 8A and 8B, the guided light portion that is reflectively scattered out of the light guide 110 exits or is emitted from the first surface 110', by way of example and not limitation. As with the prismatic micro-reflective element 116 in FIG. 8A, the micro-reflective element 116 in FIG. 8B may be either a reflective material within the light guide 110 or a cavity (e.g., a semi-circular cavity) formed in the second surface 110", as illustrated in FIG. 8B by way of example and not limitation. FIGS. 8A and 8B also illustrate the guided light 104 having two propagation directions 103, 103' (i.e., illustrated as bold arrows), by way of example and not limitation. Using two propagation directions 103, 103' may facilitate providing the plurality of directional light beams 102' of the emitted light 102 with symmetrical principal angular directions, for example.

Figure 9:
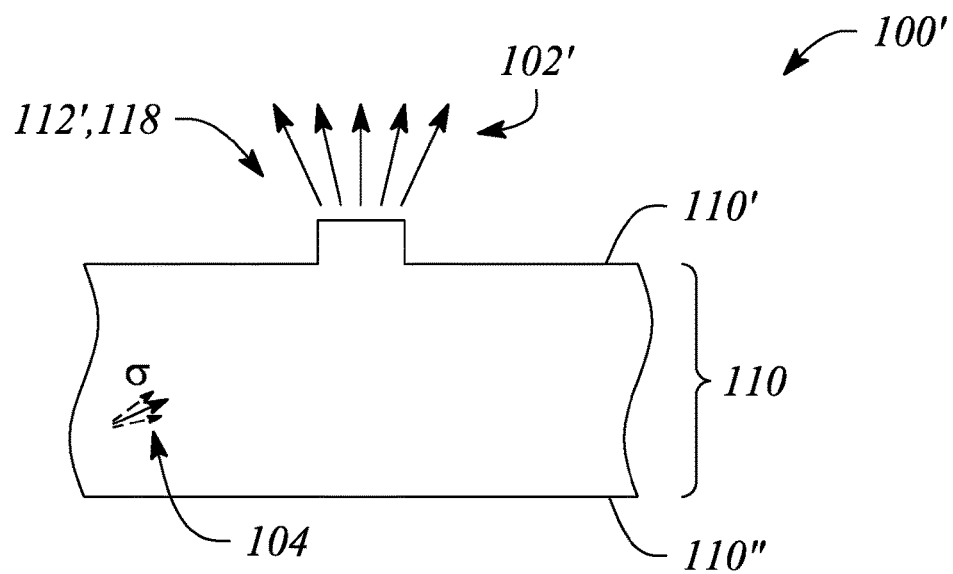
FIG. 9 illustrates a cross sectional view of a portion of a multiview backlight including a multibeam element in an example, according to another embodiment consistent with the principles described herein.

FIG. 9 illustrates a cross sectional view of a portion of a multiview backlight 100' including a multibeam element 112' in an example, according to another embodiment consistent with the principles described herein. In particular, FIG. 9 illustrates a multibeam element 112' comprising a micro-refractive element 118. According to various embodiments, the micro-refractive element 118 is configured to refractively scatter out a portion of the guided light 104 from the light guide 110. That is, the micro-refractive element 118 is configured to employ refraction (e.g., as opposed to diffraction or reflection) to scatter out the guided light portion from the light guide 110 as the directional light beams 102' of the emitted light 102, as illustrated in FIG. 9. The micro-refractive element 118 may have various shapes including, but not limited to, a semi-spherical shape, a rectangular shape or a prismatic shape (i.e., a shape having sloped facets). According to various embodiments, the micro-refractive element 118 may extend or protrude out of a surface (e.g., the first surface 110') of the light guide 110, as illustrated, or may be a cavity in the surface (not illustrated). Further, the micro-refractive element 118 may comprise a material of the light guide 110, in some embodiments. In other embodiments, the micro-refractive element 118 may comprise another material adjacent to, and in some examples, in contact with the light guide surface.

In some embodiments, the backlight 100 is configured to be substantially transparent to light in a direction through the light guide 110 orthogonal to a propagation direction 103, 103' of the guided light 104. For example, the light may be able to pass through a thickness or height of the light guide 110 from the second surface 110" to the first surface 110' or visa versa due to the transparency. Transparency may be facilitated, at least in part, due to both the relatively small size of elements that make up the angle-preserving scattering feature 112 (e.g., the multibeam elements 112'), and the relative large inter-element spacing (e.g., one-to-one correspondence with the multiview pixels 106) of the these elements.

In accordance with some embodiments of the principles described herein, a multiview display is provided. The multiview display is configured to emit modulated light beams as pixels of the multiview display. Further, the emitted modulated light beams may be preferentially directed toward a plurality of viewing directions of the multiview display. In some examples, the multiview display is configured to provide or 'display' a 3D or multiview image. Different ones of the modulated, differently directed light beams may correspond to individual pixels of different 'views' associated with the multiview image, according to various examples. The different views may provide a 'glasses free' (e.g., autostereoscopic) representation of information in the multiview image being displayed by the multiview display, for example. Uses of the multiview display include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Figure 10:
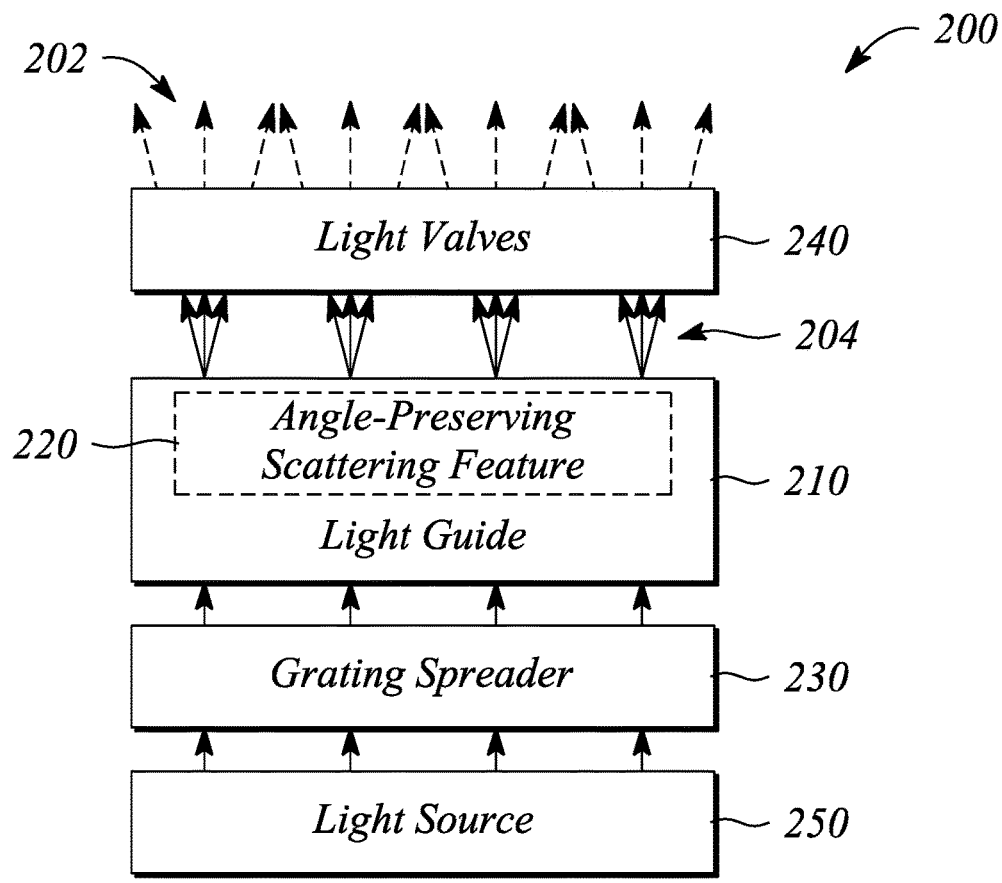
FIG. 10 illustrates a block diagram of a multiview display in an example, according to an embodiment consistent with the principles described herein.

FIG. 10 illustrates a block diagram of a multiview display 200 in an example, according to an embodiment consistent with the principles described herein. According to various embodiments, the multiview display 200 is configured to display a multiview image according to different views in different view directions. In particular, modulated light beams 202 emitted by the multiview display 200 are used to display the multiview image and may correspond to pixels of the different views (i.e., view pixels). The modulated light beams 202 are illustrated as arrows emanating from light valves 240 in FIG. 10. Dashed lines are used for the arrows of the emitted modulated light beams 202 to emphasize the modulation thereof by way of example and not limitation.

The multiview display 200 illustrated in FIG. 10 comprises light guide 210. According to some embodiments, the light guide 210 may be substantially similar to the light guide 110, described above with respect to the backlight 100. For example, the light guide 210 is configured to guide light according to total internal reflection as guided light in a propagation direction from an input edge of the light guide 210.

As illustrated in FIG. 10, the multiview display 200 further comprises an angle-preserving scattering feature 220. In particular, the angle-preserving scattering feature 220 comprises an array of multibeam elements optically coupled to the light guide 210, according to some embodiments. The multibeam element array of the angle-preserving scattering feature 220 is configured to scatter out a portion of the guided light from the light guide 210 as directional light beams 204 having principal angular directions corresponding to view directions of different views of a multiview image of the multiview display 200. Moreover, the directional light beams 204 have different principal angular directions from one another.

In some embodiments, the multibeam element of the multibeam element array of the angle-preserving scattering feature 220 may be substantially similar to the multibeam element 112' of the angle-preserving scattering feature 112, described above. For example, the multibeam element may comprise a diffraction grating substantially similar to the diffraction grating 114, described above, e.g., and illustrated in FIGS. 7A-7B. In another example, the multibeam element may comprise a micro-reflective element that is substantially similar to the micro-reflective element 116, described above, e.g., and illustrated in FIGS. 8A-8B. In yet another example, the multibeam element may comprise a micro-refractive element. The micro-refractive element may be substantially similar to the micro-refractive element 118 described above and illustrated in FIG. 9.

The multiview display 200 illustrated in FIG. 10 further comprises a grating spreader 230 comprising a diffraction grating having diffractive features extending in the propagation direction of the guided light within the light guide 210. The grating spreader 230 is configured to convert light from a light source into the guided light that is spatio-angularly homogenous prior to being scattered out by the multibeam element array as the directional light beams. In some embodiments, the grating spreader 230 may be substantially similar to the grating spreader 120 described above with respect to the backlight 100. For example, the diffraction grating of the grating spreader 230 may comprise plurality of individual diffraction gratings spaced apart from one another. In other embodiments, the diffraction grating of the grating spreader 230 may be distributed along an input edge of the light guide 210. Further, the diffraction grating of the grating spreader 230 may comprise diffractive features having a variable length profile, in some embodiments.

As illustrated in FIG. 10, the multiview display 200 further comprises an array of light valves 240. The array of light valves 240 is configured to modulate the directional light beams as the different views of the multiview image of the multiview display 200. In some embodiments, the array of light valves 240 may be substantially similar to the array of light valves 108 of the above-described backlight 100. According to some embodiments, a size of a multibeam element of the multibeam element array is greater than about one half of a size of a light valve 240 of the light valve array and less than about twice the light valve size.

In some embodiments, the multiview display 200 may further comprise a light source 250. The light source 250 is configured to provide the light to be guided as the guided light. As such, the light source 250 may provide the light to the grating spreader 230 to be converted into the guided light that is spatio-angularly homogenous. In some embodiments, the light may be provided to the grating spreader 230 at or having a non-zero propagation angle. According to some embodiments, the light source 250 may be substantially similar to the light source 130 of the backlight 100 and the multiview backlight 100', described above. For example, the light source 250 may comprise a plurality light emitting diodes (LED) or more generally a plurality of optical emitters spaced apart from one another along and optically coupled to the input edge of the light guide 210. Further, when the light source 250 comprises a plurality of optical emitters and the diffraction grating of the grating spreader 230 comprises a plurality of individual diffraction gratings, individual diffraction gratings of the plurality of individual diffraction gratings may be located between optical emitters of the optical emitter plurality of the light source 250.

Figure 11:
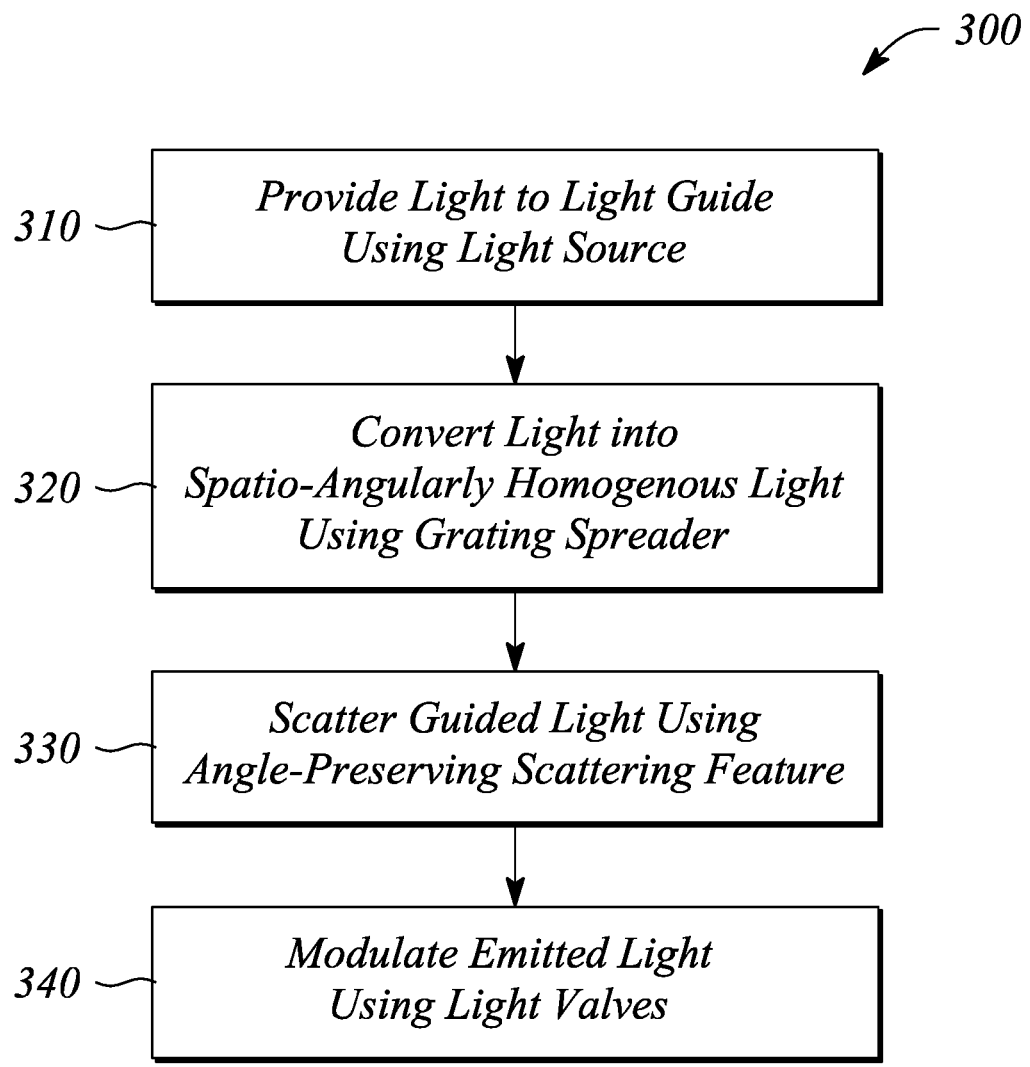
FIG. 11 illustrates a flow chart of a method of backlight operation in an example, according to an embodiment consistent with the principles described herein.

In accordance with other embodiments of the principles described herein, a method of backlight operation is provided. FIG. 11 illustrates a flow chart of a method 300 of backlight operation in an example, according to an embodiment consistent with the principles described herein. As illustrated in FIG. 11, the method 300 of backlight operation (or multiview backlight operation) comprises providing 310 light to a light guide using a light source at an input edge of the light guide. In some embodiments, the light provided to the light guide by providing 310 light has a first spread angle. For example, the light source may comprise an optical emitter that is butt-coupled to the input edge and providing 310 light introduces light to the light guide having a first spread angle that is relatively broad. In some embodiments, the light guide and the light source as well as the provided light may be substantially similar respectively to the light guide 110, the light source 130 and the light that the light source 130 provides, described above with respect to the backlight 100. For example, the light source used in providing 310 light may comprise a plurality of optical emitters spaced apart from one another along the input edge of the light guide.

The method 300 of backlight operation illustrated in FIG. 11 further comprises converting 320 the provided light into spatio-angularly homogenous light within the light guide using a grating spreader comprising a diffraction grating adjacent to the input edge of the light guide. Converting 320 the provided light into spatio-angularly homogenous light results light at an output of the grating spreader that facilitates uniform or substantially uniform illumination of the light guide and, by extension, of the backlight, according to various embodiments. In some embodiments, converting the light into spatio-angularly homogenous light may further reduce an angular spread of such that the spatio-angularly homogenous light may have a second spread angle that is less than a first spread angle of the provided light. In some embodiments, the grating spreader used in converting 320 the provided light into spatio-angularly homogenous light may be substantially similar to the grating spreader 120 described above with respect to the backlight 100. In particular, the diffraction grating of the grating spreader comprises diffractive features extending in a direction corresponding to the propagation direction of the guided light within the light guide, according to various embodiments.

In some embodiments where the light source comprises a plurality of optical emitters spaced apart from one another, the diffraction grating of the grating spreader may comprise a plurality of individual diffraction gratings spaced apart from one another and located between optical emitters of the optical emitter plurality of the light source. In other embodiments, the diffraction grating may be distributed across or substantially across a width of the light guide adjacent to the input edge of the light guide.

As illustrated in FIG. 11, the method 300 of backlight operation further comprises scattering 330 a portion of the guided light out of the light guide using an angle-preserving scattering feature of the light guide. In particular, the scattered-out portion of the guided light is emitted by the backlight as emitted light. In some embodiments, the angle-preserving scattering feature may be substantially similar to the angle-preserving scattering feature 112 of the light guide 110, described above.

In particular, in some embodiments the angle-preserving scattering feature comprises a multibeam element. In these embodiments, the emitted light comprises a plurality of directional light beams having different principal angular directions from one another. In various embodiments, the different principal angular directions of the directional light beams correspond to respective different view directions of a multiview display. Further, according to some embodiments, a size of the multibeam element may be comparable to a size of a light valve of the multiview display. For example, the multibeam element may be greater than one half of the view pixel size and less than twice the light valve size.

In some embodiments, the multibeam element of the angle-preserving scattering feature may be substantially similar to the multibeam element 112' of the multiview backlight 100', described above. For example, the multibeam element may be a member of a plurality or an array of multibeam elements. Further, in some embodiments, the multibeam element may comprise one or more of a diffraction grating, micro-reflective element and a micro-refractive element.

In some embodiments, the method 300 of multiview backlight operation further comprises modulating 340 the emitted light using a plurality of light valves. The emitted light may comprise directional light beams and the light valves may be configured as a multiview pixel of a multiview display, in some embodiments. According to some embodiments, the plurality of light valves may be substantially similar to the array of light valves 108 described above with respect to FIGS. 6A-6C and the multiview backlight 100'. In particular, different sets of light valves may correspond to different multiview pixels in a manner similar to the correspondence of the first and second light valve sets 108a, 108b to different multiview pixels 106, as described above.

Thus, there have been described examples and embodiments of a backlight, a method of backlight operation, and a multiview display that include a grating spreader configured to provide spatio-angularly homogenous light within a light guide. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A backlight comprising:
a light guide configured to guide light along a length of the light guide as guided light, the light guide having an angle-preserving scattering feature configured to scatter a portion of the guided light out of the light guide as emitted light; and
a grating spreader between a light source configured to provide light to the light guide and the angle-preserving scattering feature of the light guide, the grating spreader comprising a reflection-mode diffraction grating that includes a reflective layer and a grating layer between the reflective layer and the light guide, the grating layer having diffractive features that extend in a propagation direction of the guided light within the light guide, the grating spreader being configured to convert the light provided by the light source into spatio-angularly homogenous light within the light guide to facilitate uniform illumination of the backlight.

2. The backlight of claim 1, further comprising the light source having a plurality of optical emitters spaced apart from one another along an input edge of the light guide, the reflection-mode diffraction grating of the grating spreader comprising a plurality of individual reflection-mode diffraction gratings located between optical emitters of the optical emitter plurality of the light source.

3. The backlight of claim 1, wherein the reflection-mode diffraction grating of the grating spreader is distributed across a width of the light guide between the light source and the angle-preserving scattering feature.

4. The backlight of claim 1, wherein the diffractive features comprise one or both of ridges and grooves at a surface of the light guide, the ridges and grooves extending in a direction away from an input edge of the light guide adjacent to light source and toward the angle-preserving scattering feature of the light guide.

5. The backlight of claim 4, wherein the diffractive features of the reflection-mode diffraction grating of the grating spreader are located at opposing surfaces of the light guide.

6. The backlight of claim 1, wherein the angle-preserving scattering feature comprises a plurality of multibeam elements spaced apart from one another along the light guide length, a multibeam element of the plurality of multibeam elements being configured to scatter out from the light guide the portion of the guided light as a plurality of directional light beams having different principal angular directions corresponding to respective different view directions of a multiview display,
wherein a size of the multibeam element is between fifty percent and two hundred percent of a size of a light valve of the multiview display used to modulate the plurality of directional light beams as a multiview image.

7. The backlight of claim 6, wherein the multibeam element comprises one or more of a reflection-mode diffraction grating, a micro-reflective element and a micro-refractive element optically connected to the light guide to scatter out the portion of the guided light.

8. The backlight of claim 1, wherein a length profile of the diffractive features of the reflection-mode diffraction grating in the propagation direction of the guided light varies as a function of distance along an input edge of the light guide adjacent to the light source.

9. A multiview display comprising the backlight of claim 1, the multiview display further comprising an array of light valves configured to modulate light beams of the emitted light, a set of light valves of the array corresponding to a multiview pixel of the multiview display.

10. A multiview display comprising:
a light guide configured to guide light as guided light;
an angle-preserving scattering feature comprising an array of multibeam elements configured to scatter out a portion of the guided light as directional light beams having principal angular directions corresponding to view directions of different views of a multiview image of the multiview display;
a grating spreader comprising a reflection-mode diffraction grating that includes a reflective layer and a grating layer between the reflective layer and the light guide, the grating layer having diffractive features extending in a propagation direction of the guided light, the grating spreader being configured to convert light from a light source into the guided light that is spatio-angularly homogenous prior to the guided light being scattered out by the multibeam element array as the directional light beams; and
an array of light valves configured to modulate the directional light beams as the different views of the multiview image.

11. The multiview display of claim 10, further comprising a light source configured to provide the light to be guided as the guided light, the light source comprising a plurality of optical emitters spaced apart from one another along an input edge of the light guide.

12. The multiview display of claim 11, wherein the reflection-mode diffraction grating of the grating spreader comprises a plurality of individual reflection-mode diffraction gratings located between optical emitters of the optical emitter plurality of the light source.

13. The multiview display of claim 10, wherein a length profile of the diffractive features of the reflection-mode diffraction grating in the propagation direction of the guided light varies as a function of distance along an input edge of the light guide.

14. The multiview display of claim 10, wherein a size of a multibeam element of the multibeam element array is greater than one half of a size of a light valve of the light valve array and less than twice the light valve size.

15. The multiview display of claim 10, wherein a multibeam element of the multibeam element array comprises one or more of a diffraction grating, a micro-reflective element and a micro-refractive element optically connected to the light guide to scatter out the portion of the guided light.

16. The multiview display of claim 10, wherein the grating spreader is further configured to reduce an angular spread of the light to collimate the guided light according to a collimation factor.

17. A method of backlight operation, the method comprising:
providing light to a light guide using a light source at an input edge of the light guide;
converting the provided light into spatio-angularly homogenous light within the light guide using a grating spreader to provide guided light within the light guide, the grating spreader comprising a reflection-mode diffraction grating adjacent to the input edge of the light guide, the reflection-mode diffraction grating including a reflective layer and a grating layer between the reflective layer and the light guide, the grating layer having diffractive features extending in a direction corresponding to a propagation direction of the guided light within the light guide; and
scattering a portion of the guided light out of the light guide as emitted light using an angle-preserving scattering feature of the light guide.

18. The method of backlight operation of claim 17, wherein the light source comprises a plurality of optical emitters spaced apart from one another along the input edge of the light guide, the reflection-mode diffraction grating of the grating spreader comprising a plurality of individual reflection-mode diffraction gratings spaced apart from one another and located between optical emitters of the optical emitter plurality of the light source.

19. The method of backlight operation of claim 17, wherein the angle-preserving scattering feature comprises a multibeam element, the emitted light comprising a plurality of directional light beams having different principal angular directions from one another corresponding to respective different view directions of a multiview display.

* * * * *